US007962569B2

(12) United States Patent
Sewall et al.

(10) Patent No.: US 7,962,569 B2
(45) Date of Patent: Jun. 14, 2011

(54) EMBEDDED DNS

(75) Inventors: Pat Sewall, Boise, ID (US); Dave Johnson, Boise, ID (US)

(73) Assignee: CradlePoint, Inc., Boise, ID (US)

( * ) Notice: Subject to any disclaimer, the term of this patent is extended or adjusted under 35 U.S.C. 154(b) by 354 days.

(21) Appl. No.: 11/673,973

(22) Filed: Feb. 12, 2007

(65) Prior Publication Data
US 2007/0255848 A1 Nov. 1, 2007

Related U.S. Application Data

(63) Continuation-in-part of application No. 10/936,124, filed on Sep. 8, 2004.
(60) Provisional application No. 60/772,783, filed on Feb. 13, 2006.

(51) Int. Cl.
G06F 15/16 (2006.01)
(52) U.S. Cl. ........ 709/217; 709/223; 709/226; 370/222; 370/389; 340/825; 375/219
(58) Field of Classification Search .................. 709/226, 709/217, 223; 340/825; 370/222, 230.1, 370/389; 375/219
See application file for complete search history.

(56) References Cited

U.S. PATENT DOCUMENTS

| | | | |
|---|---|---|---|
| 5,594,946 A | 1/1997 | Menich et al. | |
| 5,859,628 A | 1/1999 | Ross et al. | |
| 6,028,848 A | 2/2000 | Bhatia et al. | |
| 6,031,844 A | 2/2000 | Lin | |
| 6,094,659 A * | 7/2000 | Bhatia | 375/222 |
| 6,377,825 B1 | 4/2002 | Kennedy et al. | |
| 6,389,462 B1 * | 5/2002 | Cohen et al. | 709/218 |
| 6,434,187 B1 | 8/2002 | Beard et al. | |
| 6,535,592 B1 | 3/2003 | Snelgrove | |
| 6,560,442 B1 | 5/2003 | Yost et al. | |
| 6,609,197 B1 | 8/2003 | Ketcham et al. | |
| 6,611,861 B1 * | 8/2003 | Schairer et al. | 709/217 |
| 6,615,262 B2 | 9/2003 | Schweitzer et al. | |
| 6,735,447 B1 | 5/2004 | Muller | |
| 6,795,700 B2 | 9/2004 | Karaoguz et al. | |

(Continued)

FOREIGN PATENT DOCUMENTS
JP 20010186565 7/2001
(Continued)

OTHER PUBLICATIONS

RFC 2136 "Dynamic Updates in the Domain Name System (DNS Update)" P. Vixie, S. Thomson, Y. Rekhter, J. Bound Internet Engineering Task Force Apr. 1997.*

(Continued)

Primary Examiner — Thu Ha T Nguyen
(74) Attorney, Agent, or Firm — Zarian Midgley & Johnson PLLC

(57) ABSTRACT

An embodiment is directed to a method for selectively routing a DNS request in which a DNS request to translate a domain name is received from a local client device. The DNS request is directed to a remote DNS server on a remote network. A link status to the remote network is identified. If the link status indicates that a connection to the remote network is not possible, the DNS request is routed to a locally embedded DNS server. If the link status indicates that a connection to the remote network is possible, the DNS request is routed to the remote DNS server on the remote network.

26 Claims, 5 Drawing Sheets

U.S. PATENT DOCUMENTS

| Patent Number | Date | Inventor(s) | Reference |
|---|---|---|---|
| 6,850,495 B1 | 2/2005 | Baum et al. | |
| 6,862,444 B2 | 3/2005 | Karaoguz et al. | |
| 6,885,859 B2 | 4/2005 | Karaoguz et al. | |
| 6,967,958 B2 | 11/2005 | Ono et al. | |
| 7,009,941 B1 | 3/2006 | Uchino | |
| 7,187,923 B2 | 3/2007 | Mousseau et al. | |
| 7,213,478 B2 | 5/2007 | Harada et al. | |
| 7,346,344 B2 | 3/2008 | Fontaine | |
| 7,382,771 B2 | 6/2008 | Leblanc et al. | |
| 7,400,903 B2 | 7/2008 | Shoemake et al. | |
| 7,421,265 B1 | 9/2008 | Liu | |
| 7,617,317 B2 | 11/2009 | Jones et al. | |
| 7,620,065 B2 | 11/2009 | Falardeau | |
| 7,693,976 B2* | 4/2010 | Perry et al. | 709/223 |
| 7,764,784 B2 | 7/2010 | Sewall | |
| 2001/0039580 A1 | 11/2001 | Walker et al. | |
| 2001/0042215 A1 | 11/2001 | Sullivan et al. | |
| 2001/0046870 A1 | 11/2001 | Stilp et al. | |
| 2002/0025832 A1 | 2/2002 | Durian et al. | |
| 2002/0062372 A1* | 5/2002 | Hong et al. | 709/225 |
| 2002/0118663 A1 | 8/2002 | Dorenbosch et al. | |
| 2003/0037165 A1 | 2/2003 | Shinomiya | |
| 2003/0043755 A1 | 3/2003 | Mitchell | |
| 2003/0045295 A1 | 3/2003 | Stanforth | |
| 2003/0046396 A1 | 3/2003 | Richter et al. | |
| 2003/0059005 A1 | 3/2003 | Meyerson et al. | |
| 2003/0126252 A1* | 7/2003 | Abir | 709/223 |
| 2003/0200308 A1 | 10/2003 | Tameda et al. | |
| 2003/0235175 A1 | 12/2003 | Naghian et al. | |
| 2004/0038697 A1 | 2/2004 | Attar et al. | |
| 2004/0049576 A1 | 3/2004 | Schweitzer et al. | |
| 2004/0110544 A1 | 6/2004 | Oyagi et al. | |
| 2004/0133689 A1 | 7/2004 | Vasisht | |
| 2004/0133793 A1 | 7/2004 | Ginter et al. | |
| 2004/0139170 A1* | 7/2004 | Shen et al. | 709/218 |
| 2004/0152449 A1 | 8/2004 | Koshihara | |
| 2004/0153676 A1 | 8/2004 | Krantz et al. | |
| 2004/0185876 A1 | 9/2004 | Groenendaal et al. | |
| 2004/0205154 A1 | 10/2004 | Dalton et al. | |
| 2004/0218544 A1 | 11/2004 | Lee | |
| 2005/0014525 A1 | 1/2005 | Tsunehara et al. | |
| 2005/0022013 A1* | 1/2005 | Schwenk | 713/201 |
| 2005/0101340 A1 | 5/2005 | Archiable | |
| 2005/0108573 A1 | 5/2005 | Bennett et al. | |
| 2005/0221850 A1 | 10/2005 | Kashiwase | |
| 2005/0233728 A1 | 10/2005 | Karaoguz et al. | |
| 2005/0245233 A1 | 11/2005 | Anderson | |
| 2005/0246434 A1 | 11/2005 | Bantz et al. | |
| 2005/0259645 A1 | 11/2005 | Chen et al. | |
| 2005/0259654 A1* | 11/2005 | Faulk | 370/392 |
| 2005/0262248 A1 | 11/2005 | Jennings, III et al. | |
| 2005/0267965 A1 | 12/2005 | Heller | |
| 2006/0047823 A1* | 3/2006 | Cheng | 709/229 |
| 2006/0072474 A1 | 4/2006 | Mitchell | |
| 2006/0077607 A1 | 4/2006 | Henricks et al. | |
| 2006/0133582 A1 | 6/2006 | McCulloch | |
| 2006/0153216 A1 | 7/2006 | Hosein et al. | |
| 2006/0171402 A1* | 8/2006 | Moore et al. | 370/401 |
| 2006/0184670 A1 | 8/2006 | Beeson et al. | |
| 2006/0187890 A1 | 8/2006 | Lin | |
| 2007/0002846 A1 | 1/2007 | Rada et al. | |
| 2007/0030857 A1 | 2/2007 | Fulknier et al. | |
| 2007/0081469 A1 | 4/2007 | Tracy et al. | |
| 2007/0083606 A1* | 4/2007 | Malik et al. | 709/207 |
| 2007/0147324 A1 | 6/2007 | McGary | |
| 2007/0153689 A1 | 7/2007 | Strub et al. | |
| 2007/0254727 A1 | 11/2007 | Sewall et al. | |
| 2007/0291711 A1 | 12/2007 | Welch et al. | |
| 2008/0005108 A1 | 1/2008 | Ozzie et al. | |
| 2008/0008165 A1 | 1/2008 | Ikeda et al. | |
| 2008/0039102 A1 | 2/2008 | Sewall et al. | |
| 2008/0043673 A1 | 2/2008 | Johnson et al. | |
| 2008/0049630 A1 | 2/2008 | Kozisek et al. | |
| 2008/0117860 A1 | 5/2008 | Rodriguez et al. | |
| 2008/0159167 A1 | 7/2008 | Ito et al. | |
| 2008/0259841 A1 | 10/2008 | Deshpande | |
| 2008/0291827 A1* | 11/2008 | Xiong et al. | 370/230.1 |
| 2008/0310407 A1 | 12/2008 | Sewall et al. | |
| 2008/0313327 A1 | 12/2008 | Sewall et al. | |
| 2009/0015419 A1 | 1/2009 | Sewall et al. | |
| 2009/0129319 A1* | 5/2009 | Buddhikot et al. | 370/328 |
| 2009/0138447 A1 | 5/2009 | Kalavade | |
| 2009/0147700 A1 | 6/2009 | Sewall et al. | |
| 2009/0168789 A1 | 7/2009 | Wood et al. | |
| 2009/0172658 A1 | 7/2009 | Wood et al. | |
| 2009/0172796 A1 | 7/2009 | Wood et al. | |
| 2009/0175285 A1 | 7/2009 | Wood et al. | |
| 2009/0180395 A1 | 7/2009 | Wood et al. | |
| 2009/0182845 A1 | 7/2009 | Johnson | |
| 2010/0014415 A1 | 1/2010 | Moeller | |
| 2010/0118846 A1 | 5/2010 | Moeller | |
| 2010/0202450 A1* | 8/2010 | Ansari et al. | 370/389 |

FOREIGN PATENT DOCUMENTS

| | | |
|---|---|---|
| KR | 20040028099 | 4/2004 |

OTHER PUBLICATIONS

RFC 2181 "Clarifications to the DNS Specification" R. Elz, R. Bush Internet Engineering Task Force Jul. 1997.*

International Search Report & Written Opinion of the International Searching Authority for Application No. PCT/US07/62079, mailed Nov. 8, 2007.

International Search Report & Written Opinion of the International Searching Authority for Application No. PCT/US07/62077, mailed Nov. 20, 2007.

International Search Report & Written Opinion of the International Searching Authority for Application No. PCT/US0/62078, mailed Mar. 5, 2008.

USPTO, "Final Office Action in U.S. Appl. No. 10/936,124.", Feb. 2, 2007.

USPTO, "Final Office Action in U.S. Appl. No. 10/936,124.", Feb. 9, 2009.

USPTO, "Final Office Action in U.S. Appl. No. 10/936,124.", Jul. 11, 2007.

USPTO, "Final Office Action in U.S. Appl. No. 10/936,124.", Sep. 3, 2009.

USPTO, "Office Action in U.S. Appl. No. 10/936,124.", Apr. 10, 2008.

USPTO, "Office Action in U.S. Appl. No. 10/936,124.", Jun. 26, 2006.

"Router", Aug. 28, 2009, Publisher: Webster's New World Telcom Dictionary 2009, Your Dictionary, www.yourdictionary.com/telecom/router.

USPTO, "Final Office Action in U.S. Appl. No. 11/673,965.", Apr. 1, 2010.

USPTO, "Office Action in U.S. Appl. No. 11/673,965.", Sep. 2, 2009.

Wikipedia, "Proxy Server, http://en.wikipedia.org/wiki/Proxy_server ; 9 pages,", Apr. 12, 2010.

USPTO, "Final Office Action in U.S. Appl. No. 11/673,956.", Apr. 15, 2010.

USPTO, "Office Action in U.S. Appl. No. 11/673,956.", Sep. 2, 2009.

USPTO, "Office Action in U.S. Appl. No. 12/172,885.", Apr. 26, 2010.

USPTO, "Office Action in U.S. Appl. No. 12/350,407.", Apr. 5, 2010.

PCT, "International Search Report and Written Opinion of the International Searching Authority for Application No. PCT/US2008/076836,", Mar. 6, 2009.

PCT, "International Search Report and Written Opinion of the International Searching Authority for Application No. PCT/US2008/083409,", May 12, 2009.

USPTO, "Office Action in U.S. Appl. No. 12/172,862", Aug. 31, 2010.

USPTO, "Final Office in U.S. Appl. No. 12/172,885 dated Nov. 2, 2010".

In Motion Technology—Take Your Business on the Road—Mobile Hotspot, "In Motion Technology, Inc. Introduces Industry's First 3G Hotspot for Passenger Productivity.", Jul. 31, 2003, Publisher: http://www.inmotiontechnology.com/newsevents/carey.html.

Mikrotik, "MikroTik Router OS V28 Reference Manual", 2005.

Peng, Dar-Tzen; Shin, K.G.; Abdelzaher, T.F., "Assignment and scheduling communicating periodic tasks in distributed real-time systems", Dec. 1997, Publisher: Software Engineering, IEEE Transactions on, vol. 23, No. 12, pp. 745-758.

USPTO, "Office Action in U.S. Appl. No. 11/673,956 dated Dec. 22, 2010".

USPTO, "Office Action in U.S. Appl. No. 12/270,419 dated Dec. 17, 2010".

USPTO, "Final Office Action in U.S. Appl. No. 12/350,407 dated Dec. 14, 2010".

USPTO, "Office Action in U.S. Appl. No. 11/673,965 dated Feb. 15, 2011".

USPTO, "Office Action in U.S. Appl. No. 12/172,862 dated Feb. 14, 2011".

* cited by examiner

EMBEDDED DNS

CROSS REFERENCE TO RELATED APPLICATIONS

This application claims the priority of provisional applications No. 60/772,783 entitled Embedded DNS Server filed Feb. 13, 2006 and hereby incorporated by reference. Application No. 60/722,783 is incorporated herein by reference. This application is a continuation in part of application Ser. No. 10/936,124 entitled Device Cradle filed Sep. 8, 2004. application Ser. No. 10/936,124 is incorporated herein by reference.

BACKGROUND

Domain Name Servers (DNS) translate domain names such as google.com into Internet Protocol (IP) numerical addresses such as 64.233.161.147. DNS servers typically reside on a remote network. When a user of a client computer needs to retrieve content from a remote web server, the user types the domain name in a browser's address bar, and presses the enter key. The client computer sends a request to the DNS server to return an IP address associated with the domain name. The DNS server replies with the IP address. Using the IP address, the client computer generates a request for the content from the remote web server. The remote web server returns the content to the client computer. The IP address is temporarily cached by the browser so that when the same domain name is requested in the future, the IP address is already known by the browser, so the browser can make future requests without first having to consult with the DNS server to obtain the IP address.

If there is a problem with the network, the translation request to the DNS server will not succeed. Generally, the network status is not available to the client computer, so it is not possible to distinguish between a non-functional network, and a slow response from the DNS server on a functional network. In such cases, browsers typically wait for a period of time and send repeated DNS requests. If the waiting and repeated requests fail to elicit a response from the DNS server in a specified period of time, the browser concludes that something is wrong with the network, times out, and displays an error message.

Likewise, if the browser is using a cached IP address, and there is a problem with the network, the browser cannot distinguish between a non-functional network and a slow response from the remote web server. In such cases, the browser waits for a period of time to receive a response, before timing out and displaying an error message.

DETAILED DESCRIPTION

INTRODUCTION: Embodiments of the present invention allow a user to connect to the Internet using a device such as an Internet enabled cellular telephone. Embodiments may be incorporated into a device referred to as a personal hotspot that acts as a router and couples to device capable of internet communication such a cellular telephone. With a personal hotspot, users of computing devices such as lap top computers, desktop computers, and personal digital assistants (PDAs) can access the internet through the data capabilities of the cellular telephone. The combination of the personal hotspot and the Internet enabled cellular telephone can create an internet-connected wireless network anywhere that there is cellular data coverage.

The user's Internet access is dependent upon an active link between the personal hotspot and an active link between the cellular telephone and the Internet. Typically, a user accesses the Internet using a browser. A conventional browser, when connected to the personal hotspot, cannot efficiently or accurately detect and inform a user of a link fault between the personal hotspot and the cellular telephone or a link fault between the cellular telephone and the Internet. When a browser makes a request to a DNS server for an IP address or to a remote web server for content, the browser typically is not equipped to determine the difference between a slow response and a link fault. A browser typically waits for a period of time and sends repeated DNS or content requests. If the waiting and repeated requests fail to elicit a response from the DNS server or remote web server within a specified period of time, the browser concludes that something is wrong with the network, times out, and displays an error message. Various embodiment embodiments operate to more efficiently inform a user of link faults.

Figure 1:
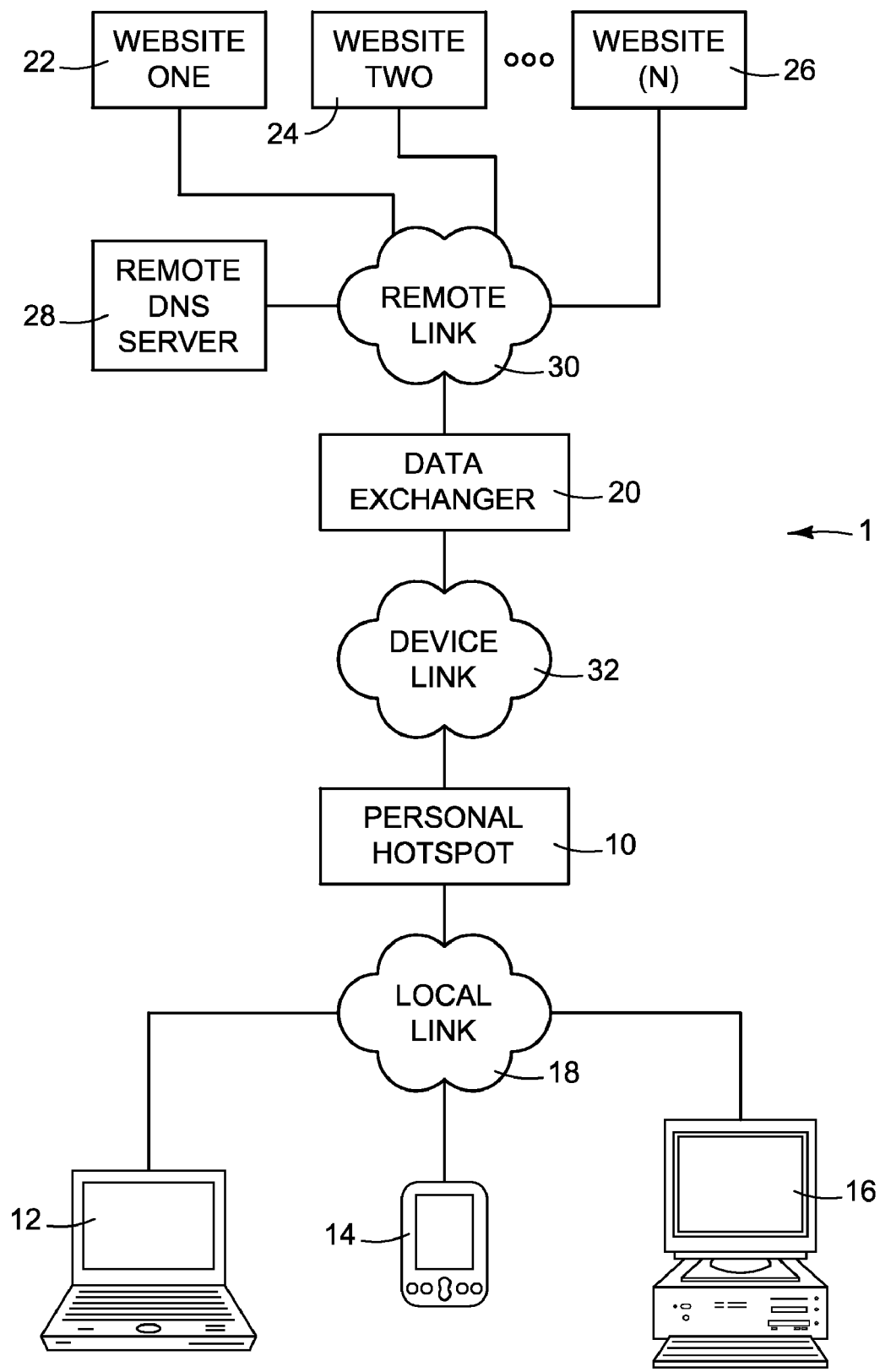
FIGS. 1 and 2 illustrate an exemplary block diagrams of environments in which embodiments of the present invention can be implemented.

ENVIRONMENT: FIG. 1 illustrates exemplary environment 1 in which various embodiments of the present invention may be implemented. Environment 1 includes personal hotspot 10 and client devices 12, 14, and 16 and local link 18. Personal hotspot 10, discussed in more detail later, represents generally any combination of hardware and/or programming capable functioning as a router for exchanging network data between client devices 12, 14, and 16 and the Internet via a data exchanger 20. Client devices 12, 14, and 16 represent generally any computing devices capable of communicating with personal hotspot 10.

Local link 18 interconnects personal hotspot 10 and client devices 12, 14, 16. Local link 18 represents generally a cable, wireless, or remote link via a telecommunication link, an infrared link, a radio frequency link, or any other connector or system that provides electronic communication between devices 10, 12, 14, and 16. The path followed by link 18 between devices 10, 12, 14, and 16 in the schematic view of FIG. 1 represents the logical communication path between these devices, not necessarily the physical path between the devices. Devices 10, 12, 14, and 16 can be connected at any point and the appropriate communication path established logically between the devices.

Environment 1 also includes data exchanger 20, web sites 22, 24, and 26, Remote DNS server 54, and remote link 30. Data exchanger (20) represents generally and combination of hardware and/or programming that can be utilized by personal hotspot 10 to connect to a remote network such as the Internet. Examples include but are not limited to Internet enabled cellular telephones, DSL modems, and cable modems. Web sites 22, 24, and 26 represent generally any web sites equipped to serve content at the request of a computing device such as client devices 12, 14, and 16. Remote DNS server 54 represents generally any network service capable of translating domain names into IP addresses on request.

Remote link 30 interconnects data exchanger 20, websites 22, 24, and 26, and Remote DNS server 54. Remote link 30 represents generally any combination of a cable, wireless, or remote connection via a telecommunication link, an infrared link, a radio frequency link, or any other connector or system that provides electronic communication between devices 20, 22, 24, 26, and 28. Remote link 30 may represent an intranet, an Internet, or a combination of both. The path followed by remote link 30 between devices 20, 22, 24, 26, and 28 in the schematic view of FIG. 1 represents the logical communication path between these devices, not necessarily the physical path between the devices. Devices 20, 22, 24, 26, and 28 can be connected to the network at any point and the appropriate communication path established logically between the devices.

In the embodiment illustrated in environment 1, device link 32 interconnects personal hotspot 10 and data exchanger. Device link 32 represents generally any combination of a cable, wireless, or remote connection via a telecommunication link, an infrared link, a radio frequency link, or any other connector or system that provides electronic communication between devices 10 and 20. As examples, device link 32 may incorporate a physical cable or radio waves carrying Bluetooth communications.

Looking at FIG. 1, remote DNS server 25 and websites 22, 24, and 26 can be said to be located on one or more remote networks with respect to personal hotspot 10. Client devices 12, 14, and 16 can be said to be on a local network with respect to personal hotspot 10. As used through this specification, the terms local and remote are used in this context. In the example of FIG. 1, a component or device that is local is a component or device that is local with respect to the local network of personal hotspot 10. A component that is remote is a component such as remote DNS server 28 that is remote with respect to personal hotspot 10.

Communication between client devices 12, 14, and 16 and remote devices such as remote DNS server 54 and websites 22, 24, and 26 is dependent upon local link 18, device link 32, and remote link 30. Typically, applications such as browsers operating on client devices 12, 14, and 16 can detect a fault in local link 18 because communication with personal hotspot 10 will not be possible. However, such applications will not be able to identify faults in device link 32 and remote link 30. As will be discussed below with respect to FIG. 3, personal hotspot 10 is configured to identify faults in device link 32 and remote link 30 and to inform client devices 12, 14, and 16 of any such faults.

Figure 2:
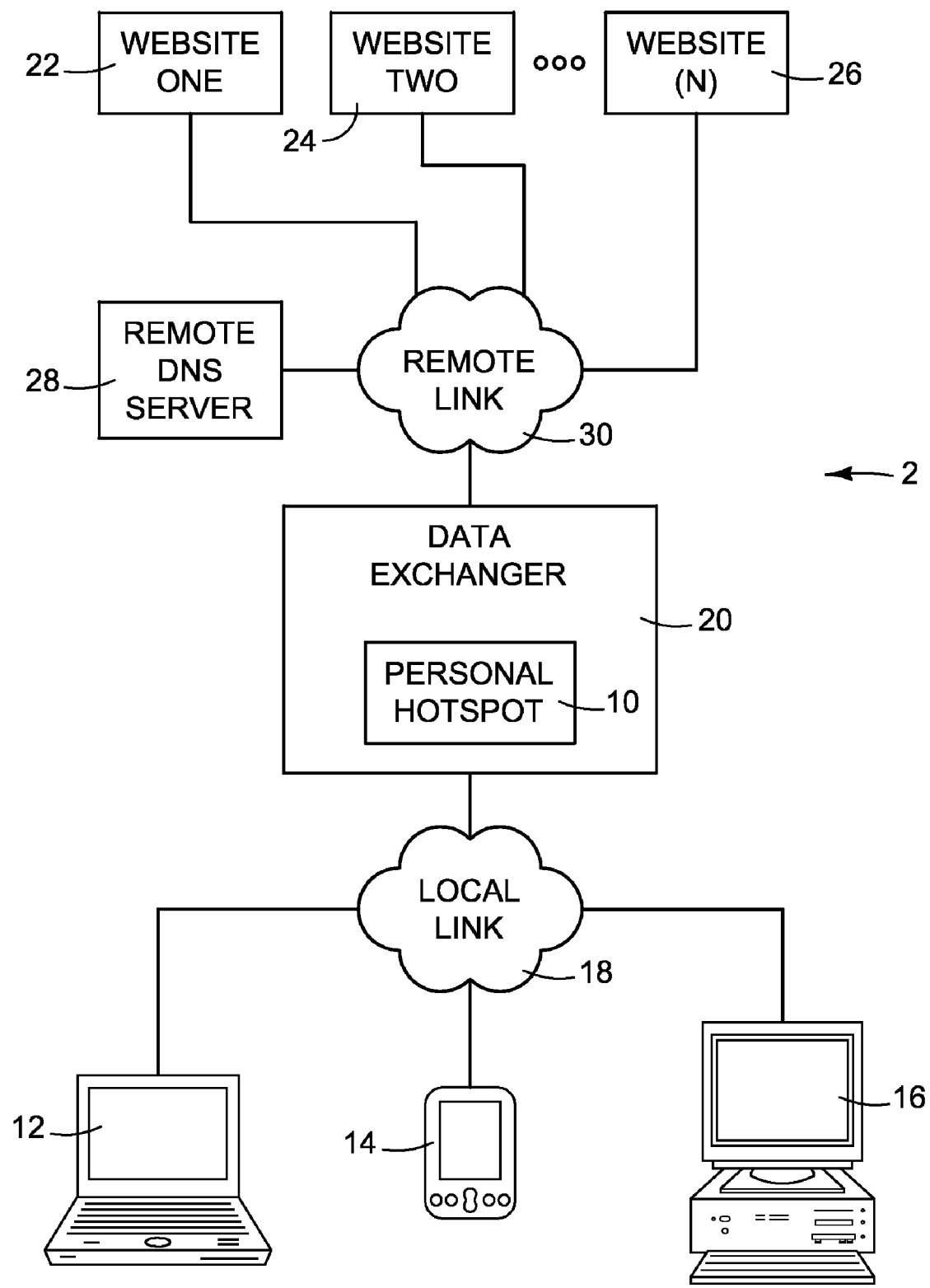

FIG. 2 illustrates another exemplary environment 2 in which various embodiments of the present invention may be implemented. In the example of FIG. 2, Data exchanger 20 and personal hotspot 10 are incorporated within the same device. In such a configuration, device link 32 (shown in FIG. 1) is eliminated and replaced with internal connections.

Viewing the environment 2 in FIG. 2, communications between client devices 12, 14, and 16 and remote devices such as Remote DNS server 54 and websites 22, 24, and 26 is dependent upon local link 18 and remote link 30. Typically, applications such as browsers operating on client devices 12, 14, and 16 can detect a fault in local link 18 because communication with personal hotspot 10 will not be possible. However, such applications will not be able to identify faults in remote link 30. As will be discussed below with respect to FIG. 3, personal hotspot 10 is configured to identify faults in remote link 30 and to inform client devices 12, 14, and 16 of any such faults.

Figure 3:
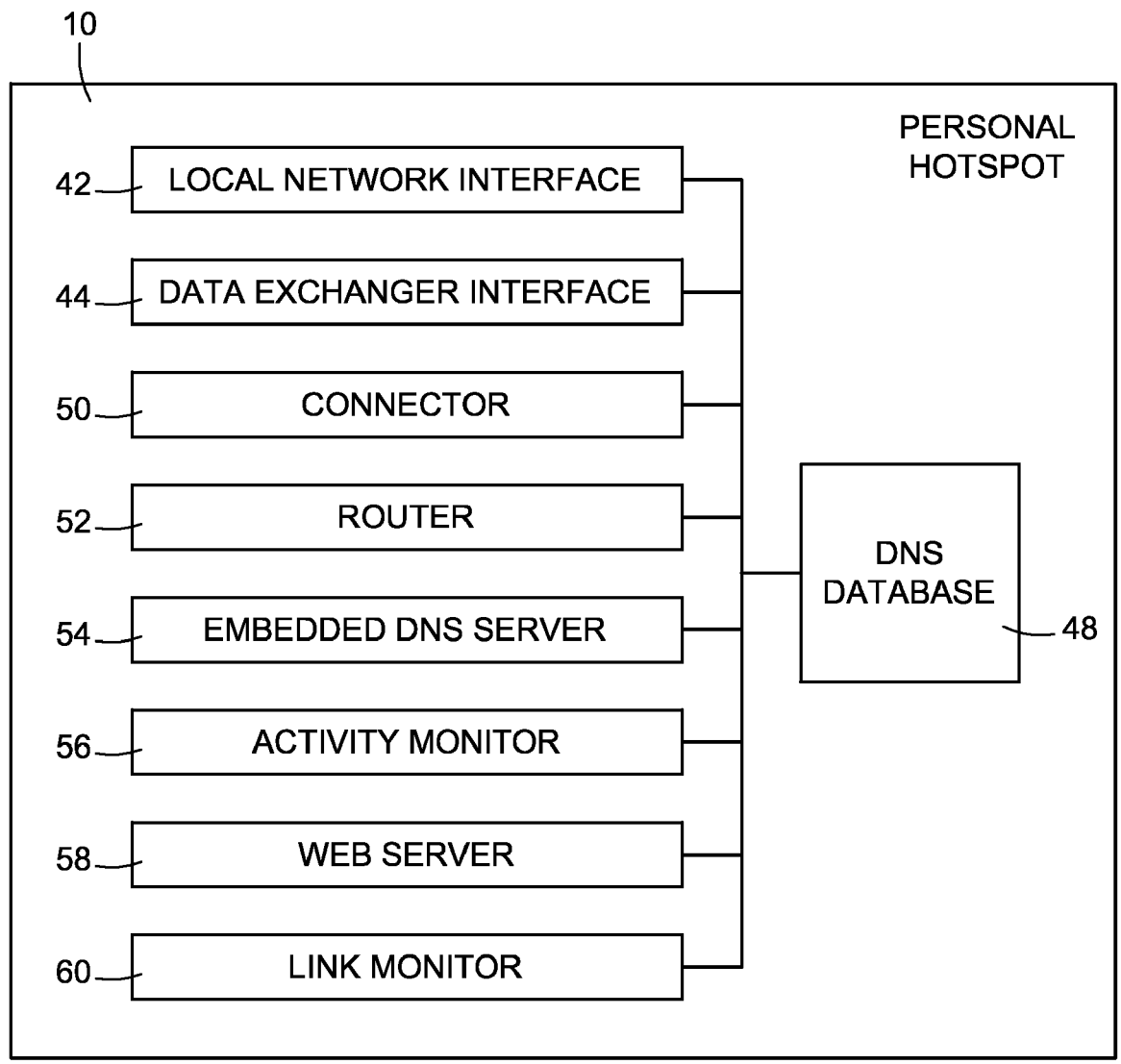
FIG. 3 is a block diagram showing physical and logical components of a personal hotspot with embedded DNS server according to an embodiment of the present invention.

PERSONAL HOTSPOT: FIG. 3 is a block diagram illustrating physical and logical components of personal hotspot 10. As described above, personal hotspot 10 represents generally any combination of hardware and/or programming capable of functioning as a router for exchanging network data between client devices and the Internet via a data exchanger such as an Internet enabled cellular telephone, DSL modem, or cable modem.

In the example of FIG. 3 personal hotspot 10 includes local network interface 42 and data exchanger interface 44. Local network interface 42 represents generally any combination of hardware and/or program instructions capable of supplying a communication interface between personal hotspot 10 and client devices 12, 14, and 16 shown in FIGS. 1 and 2. Data exchanger interface 44 represents any combination of hardware and/or programming enabling data to be communicated between personal hotspot 10 and a data exchanger 20 shown in FIGS. 1 and 2. For example, interfaces 42 and 44 may include a transceiver operable to exchange network communications utilizing a wireless protocol such as ultrawideband (UWB), Bluetooth, or 802.11. Alternatively, interfaces 42 and 44 may include physical ports or other physical connection points enabling wired communication.

Personal hotspot 10 also includes DNS database 48, connector 50, link monitor 52, router 54, activity monitor 56, DNS server 58, and web server 60. DNS database 48 represents generally any memory configured to store DNS translation data, that is, a listing of IP addresses and an associated domain name for each. DNS database 48 may initially contain a set of default IP addresses and corresponding domain names. Later, based on user activity, it may be desirable to add to that default set or to replace certain items in that set.

Connector 50 represents generally any combination of hardware and/or programming for sending a signal to data exchanger 20 to connect to the Internet. For example, where a data exchanger 20 is a cellular telephone, connector 50 may send a signal causing the cellular telephone to establish a data link to the Internet.

Router 52 represents generally any combination of hardware and/or programming for routing outbound network communication received through network interface 42 to be transmitted by data exchanger 20 to a remote network. Router 52 is also responsible for routing inbound network communications received from the remote network and directed via network interface 42 to a specified client device 12, 14, or 16. Outbound and inbound network communications, for example can be an IP (internet Protocol) packets directed to a target on a remote network or to a particular network device on the local area network.

Embedded DNS server 54 represents generally a combination of hardware and/or programming embedded in personal hotspot 10. Embedded DNS server 54 is responsible for translating domain names into IP addresses. When a user of a client device 12, 14, or 16 desires to retrieve content from a website 22, 24, or 26, the user types the domain name in a browser's address bar, and presses the enter key. The client device 12, 14, or 16 sends a request to embedded DNS server 54 to return an IP address associated with the domain name. Embedded DNS server 54 determines if it is able to translate the domain name. For example, embedded DNS server 54 determines if an IP address associated with the domain name can be found in DNS database 48. If so, embedded DNS server 54 obtains the associated IP address and returns it to the requesting client device 12, 14, or 16. If a link fault exists and the requested domain name cannot be translated, embedded DNS server returns a local address for personal hotspot 10.

In one embodiment, local translation using embedded DNS server 54 occurs only when a link fault exists. In other embodiments remote DNS server 28 is used only when necessary, that is, when embedded DNS server 58 is not able to translate a particular domain name.

Activity monitor 56 represents generally any combination of hardware and/or programming capable of monitor outbound network request activity of client devices 12, 14, and 16. Activity monitor 56 is also responsible for updating DNS database 48 according to the monitored activity. The memory available for DNS database 48 is limited, so DNS database 48 cannot store all the data needed to translate every possible domain name. In fact, DNS database 48 can only store information for limited number of domain names. As noted above, personal hotspot may be used to access a wide variety of web sites having domain names not represented in DNS database 48. Activity monitor 56 is responsible for generating activity data representing information concerning domain names and IP addresses requested by client devices 12, 14, and 16 that are not represented in DNS database 48. For each such domain name or IP address, activity monitor 56 may record the number of times each site has been visited in a given period. This activity information can then be used to update the DNS database 48 to include additional IP addresses and domain names based on user activity. Where memory availability is a concern, the activity information could be used to replace IP addresses and domain names that are not being used or are of an otherwise low priority indicated by user activity.

Web server 58 represents generally any combination of hardware and/or programming capable of serving an interface such as a web page to client devices 12, 14, and 16. Such web pages may include error messages, instructions, and various user accessible controls for selecting configuration settings related to the operation of personal hotspot 10.

Link monitor 60 represents generally any combination of hardware and/or programming capable of identifying a link status for personal hotspot 10. The link status is information that can be used by router 52 to determine the existence of faults in device link 32 and remote link 30. Where a fault exists, router 52 can cause web server 58 to return link fault content to a source of a communication that would otherwise be routed to a remote network. The link fault content, for example, can be a web page containing data identifying the nature of the fault and any instructions for correcting the fault.

In the Example of FIG. 1, personal hotspot 10 couples to data exchanger 20 via device link 32. Device link 32 may be a wired link utilizing a protocol such as USB or a wireless link utilizing a protocol such as Bluetooth. Personal hotspot 10 and data exchanger 20 negotiate a link according the particular protocol in use. As part of that protocol, the data exchanger 20 identifies itself to personal hotspot 10. In the absence of such an identification, link monitor 60 can determine that a device link fault exists.

Using the identification information received to establish device link 32, personal hotspot 10 can identify a particular set of commands supported by data exchanger 20. With that information connector 50 can issue a command for data exchanger 20 to connect to the Internet via remote link 30. Data exchanger 20 responds with an indication of a success or failure to connect. Upon receiving a failure to connect response, link monitor 60 can determine that a remote link fault exists. Moreover, data exchangers such as internet enabled cellular telephones are typically aware if they are in a cellular coverage area, and if so, what kind of service is available, including the type of data service. Such devices can also identify when connections drop out. This status information has traditionally been displayed to the user through the cellular telephone's user interface. However, the same status information can be obtained by link monitor 60 via device link 32 to identify the existence of a remote link fault.

Figure 4:
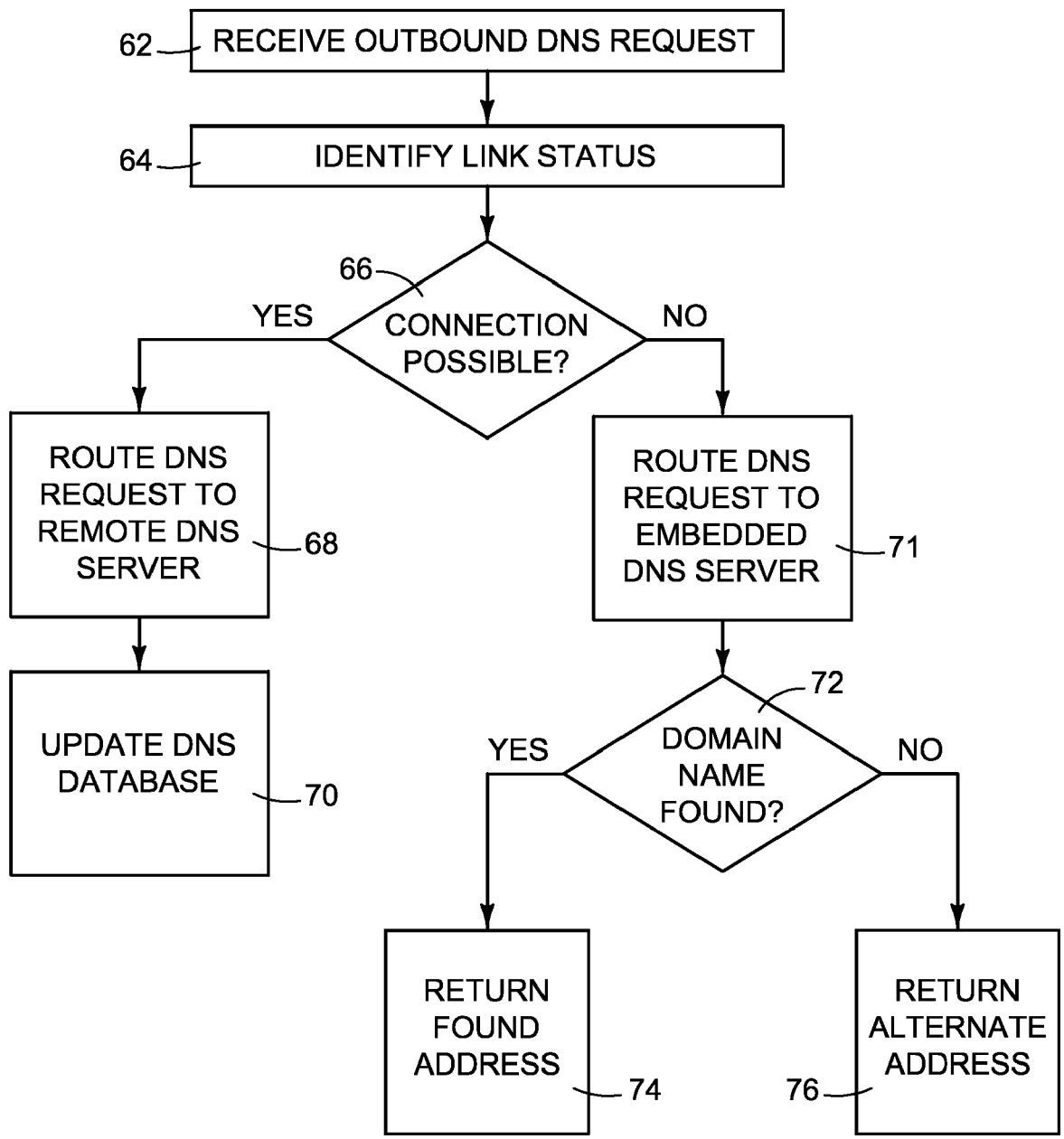
FIGS. 4-5 are exemplary flow diagram illustrating steps taken in performance of various embodiments of the present invention.
Figure 5:
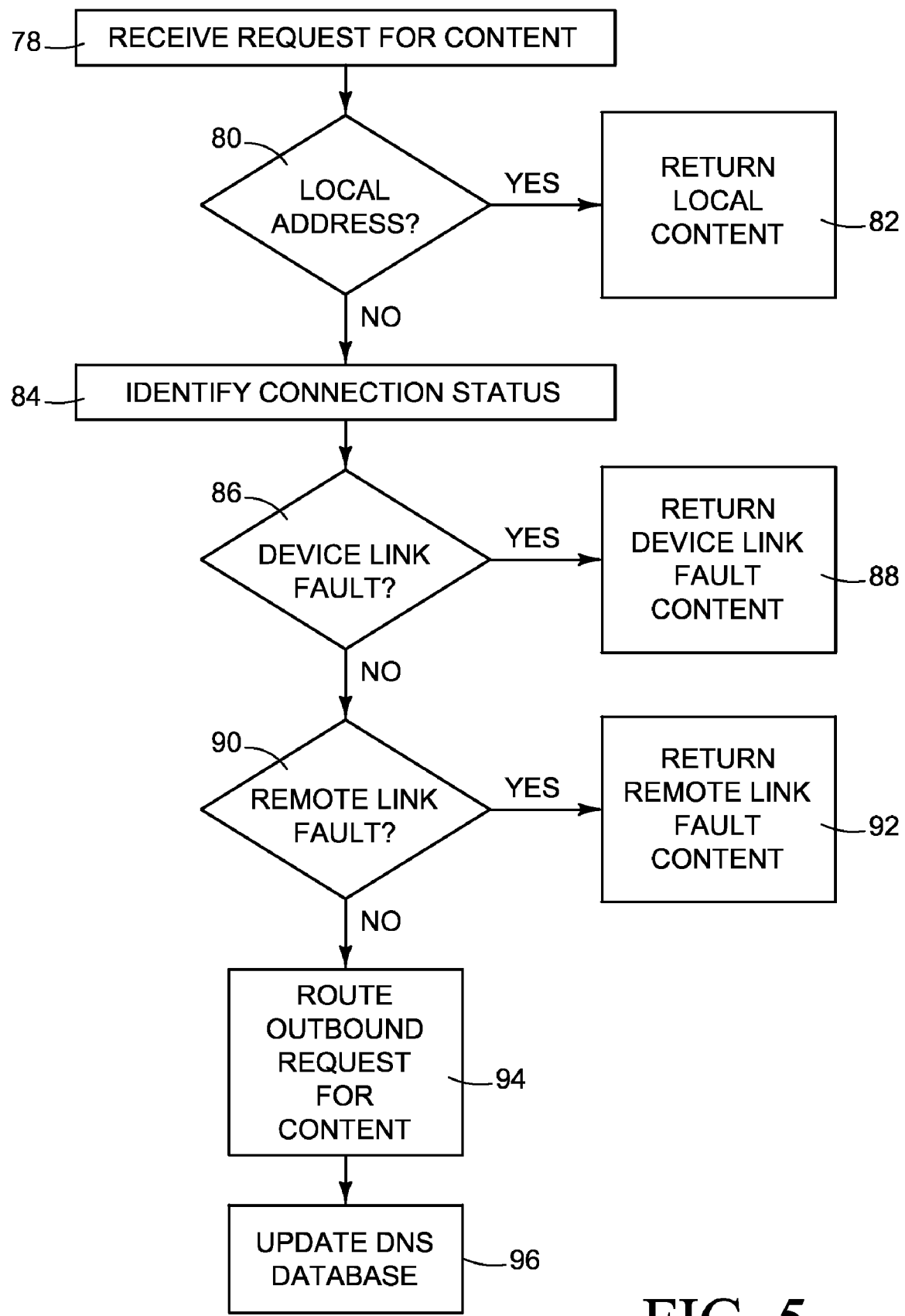

OPERATION: The operation of embodiments of the present invention will now be described with reference to FIGS. 4-5. FIG. 4 is an exemplary flow diagram that helps illustrate actions taken by personal hotspot 10 upon receiving a DNS request. FIG. 5 is an exemplary flow diagram that helps illustrate actions taken by personal hotspot 10 upon receiving a request for content.

Starting with FIG. 4, personal hotspot 10 receives a DNS request directed to a remote DNS server (step 62). A link status is then identified (step 64). A link status is an indication of whether or not a connection can be made between personal hotspot 10 and the Internet. When connection is not possible, a link fault exists. Step 64, for example, may be performed by link monitor 60. In the Example of FIG. 1, a link fault may be a fault in remote link 30 fault or a fault in a device link 32. Based on the identified link status, it is determined whether a connection to the remote DNS server is possible (step 66). If a connection is possible, the DNS request is routed to the remote DNS server (step 68). Based on this outbound activity and previously monitored personal hotspot activity, DNS database 48 may be updated (step 70).

For example, activity monitor 56 may determine that the domain name provided in the DNS request has been requested before and based on some predetermined criteria can be considered a popular domain with respect to client devices 12, 14, and 16. As such, activity monitor may update DNS database 48 to include that domain name and its corresponding IP address returned from remote DNS server 28. In other words, step 70 may be accomplished based on an evaluation of the domain name in a DNS request routed in step 68, a translated address returned from remote DNS server 28, and previously monitored network request activity received from client devices 12, 14, and 16.

Where, in step 66, it is determined that a connection is not possible, the DNS request is instead routed to a locally embedded DNS server such as embedded DNS server 54 shown in FIG. 3. The locally embedded DNS server determines whether it is able to translate the domain name in the DNS request. In the Example of FIG. 3, it is determined if that domain named can be found in DNS database 48 (step 72). If found, the locally embedded DNS server returns the IP address associated with the domain name (step 74). If the domain name is not found in step 72, the locally embedded DNS server returns an alternate IP address (step 76). The alternate IP address may, for example, be the local address for personal hotspot 76.

In this manner, when a client device 12, 14, or 16 communicates a DNS request, that client device receives a prompt response providing the requested IP address or an alternate IP address even in the presence of a link fault. The client device 12, 14, or 16 need not send repeated DNS requests that ultimately result in a time-out response.

Moving to FIG. 5, personal hotspot receives a request for content (step 78). Step 78, for example, may occur when client device 12, 14, or 16 sends an IP request directed to website 22, 24, or 26. Step 78 may occur after the requesting client device 12, 14, or 16 has received a response to a previous DNS request such as a DNS request communicated in step 62 of FIG. 4. The IP request may instead be for the local address of personal hotspot 10 or that of another of client devices 12, 14, and 16. It is determined if the IP request is for a local address (step 80) and if so the local content is returned (step 82).

If the IP request is not for a local address, a link status is then identified (step 84). A link status is an indication of whether or not a connection can be made between personal hotspot 10 and the Internet. When connection is not possible, a link fault exists. Step 84, for example, may be performed by link monitor 60. In the Example of FIG. 1, a link fault may be a fault in remote link 30 or a fault in a device link 32. Based on the determination of step 64, it is determined whether a device link fault exists (step 86). If so, device link fault content is returned (step 88). For example, where link monitor 60 identifies a device link fault, link monitor 60 causes web server 58 to return a web page containing content explaining the fault and providing guidance for correcting the fault. Where data exchanger is a cellular telephone, a device fault may exist when personal hotspot is not physically connected to the cellular telephone or the cellular telephone is turned off. The returned web page may contain information instructing a user to turn on the telephone or establish a connection between the telephone and personal hotspot 10.

If no device link fault exists, it is determined if a remote link fault exists (Step 90). If so, remote link fault content is returned (step 92). For example, where link monitor 60 identifies a remote link fault, link monitor 60 causes web server 58 to return a web page containing content explaining the fault and providing guidance for correcting the fault. Where data exchanger is a cellular telephone, a remote fault may exist when the cellular telephone is in a non-transmission mode often referred to as "Flight Mode" allowing the phone to be used during commercial airline flights. A remote fault can also exist when the cellular telephone is out of a coverage area for cellular data service or if the cellular telephone does not have an active data plan. The returned web page may contain information identifying the possible causes of the remote link fault as well as suggested solutions.

In the absence of a device link fault and remote link fault, the request for content is routed to its intended recipient (step 94). Based on this outbound activity and previously monitored personal hotspot activity, DNS database 48 may be updated (step 70). For example, activity monitor 56 may determine that the IP address provided in the DNS request has been requested before and based on some predetermined criteria can be considered a popular address with respect to client devices 12, 14, and 16. As such, activity monitor may update DNS database 48 to include that IP address and its corresponding domain name.

CONCLUSION: The schematic diagrams of FIGS. 1 and 2 illustrate exemplary environments in which embodiments of the present invention may be implemented. Implementation, however, is not limited to these environments. The diagram of FIG. 3 shows the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 4-5 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for selectively routing a DNS request, comprising:
   receiving a DNS request to translate a domain name, the DNS request being received from a local client device and directed to a remote DNS server on a remote network;
   identifying a link status to the remote network;
   if the link status indicates that a connection to the remote network is not possible, routing the DNS request to a locally embedded DNS server, the locally embedded DNS server accessing a DNS database, wherein the DNS database comprises a set of default IP addresses and corresponding domain names that are not obtained by prior user activity;
   if the link status indicates that a connection to the remote network is possible, then:
      routing the DNS request to the remote DNS server on the remote network; and
      updating the DNS database utilized by the locally embedded DNS server,
      wherein updating comprises updating the DNS database based on an evaluation of the domain name in the DNS request, a translated address returned from the remote DNS server, and previously monitored network request activity received from the client device, and further wherein updating comprises updating the DNS database to include information reflective of domain name and the translated address, the updated information being for use by the locally embedded DNS server in translating a DNS request for the domain name,
   wherein the connection to the remote network is provided by a data exchanger that is configured to connect to a cellular network.

2. The method of claim 1, further comprising after routing the DNS request to the locally embedded DNS server, determining if the domain name can be translated locally by the embedded DNS server, returning the translated address to the client device if the domain name can be translated locally, and returning an alternate address to the client device if the domain name cannot be translated locally.

3. The method of claim 2, wherein returning an alternate address comprises returning a local address of a device containing the locally embedded DNS server.

4. The method of claim 1, further comprising:
   receiving a request for content, the request for content being a request received from the local client device and directed to a translated address on the remote network returned in response to the DNS request; and if the link status indicates that a connection to the remote network is not possible, returning link fault content to the local client device.

5. The method of claim 4, wherein identifying a link status to the remote network comprises determining the existence of a device link fault or a remote link fault.

6. The method of claim 5, wherein returning link fault content comprises returning device link fault content upon determining a device link fault and returning remote link fault content upon determining the existence of a remote link fault.

7. The system of claim 1, wherein the data exchanger is a cellular telephone.

8. The system of claim 1, wherein the data exchanger is incorporated into a personal hotspot.

9. A non-transitory computer readable medium comprising computer executable instructions for:

receiving a DNS request to translate a domain name, the DNS request being received from a local client device and directed to a remote DNS server on a remote network;

identifying a link status to the remote network; and if the link status indicates that a connection to the remote network is not possible, routing the DNS request to a local DNS server, the local DNS server accessing a DNS database, wherein the DNS database comprises a set of default IP addresses and corresponding domain names that are not obtained by prior user activity;

if the link status indicates that a connection to the remote network is possible, then:

routing the DNS request to the remote DNS server on the remote network; and updating the DNS database utilized by the locally embedded DNS server, wherein updating comprises updating the DNS database based on an evaluation of the domain name in the DNS request, a translated address returned from the remote DNS server, and previously monitored network request activity received from the client device, and further wherein updating comprises updating the DNS database to include information reflective of domain name and the translated address, the updated information being for use by the locally embedded DNS server in translating a DNS request for the domain name, wherein the local DNS server is embedded with the computer readable medium in a personal hotspot.

10. The medium of claim 9, having further instructions for determining if the domain name can be translated locally by the embedded DNS server, returning the translated address to the client device if the domain name can be translated locally, and returning an alternate address to the client device if the domain name cannot be translated locally.

11. The medium of claim 10, wherein the instructions for returning an alternate address include instructions for returning a local address of a device containing the locally embedded DNS server.

12. The medium of claim 9, further comprising:

receiving a request for content, the request for content being a request received from the local client device and directed to a translated address on the remote network returned in response to the DNS request; and if the link status indicates that a connection to the remote network is not possible, returning link fault content to the local client device.

13. The medium of claim 12, wherein the instructions for identifying a link status to the remote network include instructions for determining the existence of a device link fault or a remote link fault.

14. The medium of claim 13, wherein the instructions for returning link fault content include instructions for returning device link fault content upon determining a device link fault and returning remote link fault content upon determining the existence of a remote link fault.

15. The method of claim 9, wherein the connection to the remote network is provided via a data exchanger that is configured to connect to a cellular network.

16. The system of claim 15, wherein the data exchanger is a cellular telephone.

17. The system of claim 15, wherein the data exchanger is incorporated into the personal hotspot.

18. A system for selectively routing a DNS request, comprising:

a locally embedded DNS server;

a router operable to receive a DNS request to translate a domain name, the DNS request being received from a local client device and directed to a remote DNS server on a remote network; and a link monitor operable to identify a link status between the system and the remote network; and a DNS database comprising a set of default IP addresses and corresponding domain names that are not obtained by prior user activity;

wherein the router is operable to route the DNS request to a locally embedded DNS server if the link status indicates that a connection to the remote network is not possible, the locally embedded DNS server being configured to access the DNS database, wherein the system for selectively routing a DNS request is physically configured to connect to the remote network via a data exchanger that connects to a cellular network, wherein the locally embedded DNS server is operable to route the DNS request to the remote DNS server on the remote network if the link status indicates that a connection to the remote network is possible, and wherein the locally embedded DNS server is operable to translate domain names identified in the DNS database, the system further comprising an activity monitor operable to update the DNS database, wherein the activity monitor is operable to update the DNS database based on an evaluation of the domain name in the DNS request, a translated address returned from the remote DNS server, and previously monitored network request activity received from the client device, and wherein the activity monitor is operable to update the DNS database to include information reflective of the domain name received in a DNS request and a translated address returned from the remote DNS server.

19. The system of claim 18, wherein the locally embedded DNS server is operable to determine if the domain name can be translated locally, to return the translated address to the client device if the domain name can be translated locally, and to return an alternate address to the client device if the domain name cannot be translated locally.

20. The system of claim 19, wherein the locally embedded DNS server is operable to return the alternate address in the form of a local address of a device containing the locally embedded DNS server.

21. The system of claim 18, wherein the router is operable to:

receive a request for content, the request for content being a request received from the local client device and directed to a translated address on the remote network returned in response to a DNS request;

if the link status indicates that a connection to the remote network is not possible, cause link fault content to be returned to the local client device; and if the link status indicates that a connection to the remote network is possible, route the request for content to the translated address.

22. The system of claim 21, wherein the fault monitor is operable to identify a link status by determining the existence of a device link fault or a remote link fault.

23. The system of claim 22, wherein the link fault content includes device link fault content when the link status indicates a device link fault, and the link fault content includes remote link fault content when the link status indicates the existence of a remote link fault.

24. The system of claim 18, wherein the data exchanger, router, and the locally embedded DNS server are incorporated into a personal hotspot.

25. The system of claim 18, wherein the data exchanger is a cellular telephone.

26. A method for selectively routing DNS requests, comprising:

receiving a first DNS request to translate a domain name, the first DNS request being received from a local client device and directed to a remote DNS server on a remote network;

identifying a first link status to the remote network;

determining whether the first link status indicates that a connection to the remote network is not possible, and if it is not possible, routing the DNS request to a locally embedded DNS server, the locally embedded DNS server accessing a DNS database, wherein the DNS database comprises a set of default IP addresses and corresponding domain names that are not obtained by prior user activity;

receiving a second DNS request to translate a domain name, the second DNS request being received from a local client device and directed to a remote DNS server on a remote network;

identifying a second link status to the remote network; and determining whether the link status indicates that a connection to the remote network is possible, and if so, then:

routing the DNS request to the remote DNS server on the remote network; and updating the DNS database utilized by the locally embedded DNS server, wherein updating comprises updating the DNS database based on an evaluation of the domain name in the DNS request, a translated address returned from the remote DNS server, and previously monitored network request activity received from the client device, and further wherein updating comprises updating the DNS database to include information reflective of domain name and the translated address, the updated information being for use by the locally embedded DNS server in translating a DNS request for the domain name, wherein the connection to the remote network is provided by a data exchanger that is configured to connect to a cellular network.

* * * * *